US 8,577,959 B2

(12) United States Patent
Pandey et al.

(10) Patent No.: US 8,577,959 B2
(45) Date of Patent: Nov. 5, 2013

(54) MANAGING RECURRING APPOINTMENTS

(75) Inventors: Prabhat Kumar Pandey, Hyderabad (IN); Abhishek Kumar Gupta, Hyderabad (IN); Sandhya Vankamamidi, Hyderabad (IN); Sutirtha Saha, Hyderabad (IN); Kulo Rajasekaran, Hyderabad (IN); David Robert Shutt, Seattle, WA (US); Derik Bjorn Stenerson, Redmond, WA (US); Niraj Yadav, Hyderabad (IN); Ramesh Prasad Pandey, Uttar Pradesh (IN); Sharad Sharma, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 555 days.

(21) Appl. No.: 12/828,355

(22) Filed: Jul. 1, 2010

(65) Prior Publication Data
US 2012/0005261 A1    Jan. 5, 2012

(51) Int. Cl.
*G06F 15/16* (2006.01)

(52) U.S. Cl.
USPC .......................................... 709/203

(58) Field of Classification Search
USPC .......................................... 709/203
See application file for complete search history.

(56) References Cited

U.S. PATENT DOCUMENTS

| | | | |
|---|---|---|---|
| 7,016,909 B2 | 3/2006 | Chan et al. | |
| 2005/0192857 A1 | 9/2005 | Levine | |
| 2008/0235072 A1 | 9/2008 | Gupta et al. | |
| 2009/0282125 A1 | 11/2009 | Jeide et al. | |
| 2009/0299810 A1 | 12/2009 | Jardine et al. | |
| 2010/0262926 A1* | 10/2010 | Gupta et al. | 715/764 |
| 2011/0054976 A1* | 3/2011 | Adler et al. | 705/9 |

OTHER PUBLICATIONS

"End Recurring Appointment in Outlook Calendaring", Retrieved Apr. 8, 2010, from << http://www.microsoft.com/office/community/en-us/default.mspx?mid=f101c729-d54e-441a-8ed6-51caaf88b4cb&dg=microsoft.public.outlook.calendaring >>, 1 page.

"Microsoft Dynamics CRM 4.0—Outlook Synchronization in Microsoft Dynamics CRM", Jan. 2010, Retrieved from << http://www.sonomapartners.com/Documents/CRM/MicrosoftCRM4-OutlookSynchronization.pdf >>, White Paper: "Nuts and Bolts" Series, 18 pages.

"Synchronizing with PIMs", May 20, 2009, Retrieved from << http://download.oracle.com/docs/cd/E14388_01/books/OnDemOLH/index.htm?toc.htm?syncpimmainhelp.html >>, 3 pages.

Bmarkham., "Salesforce CRM for Outlook Pilot—Winter '10 Release", Oct. 7, 2009, Retrieved from << http://sites.force.com/ideaexchange/apex/ideaview?id=08730000000BqnTAAS >>, 3 pages.

"Outlook Integration for Amdocs CRM 6", 2007, Retrieved Apr. 8, 2010, from << http://www.crm-outlook-integration.com/docs/Whitepaper.pdf >>, Technical White Paper, 11 pages.

\* cited by examiner

*Primary Examiner* — Hee Soo Kim
(74) *Attorney, Agent, or Firm* — Hope Baldauff, LLC

(57) ABSTRACT

Concepts and technologies are described herein for managing recurring appointments without losing historical data associated with the recurring appointments. In accordance with the concepts and technologies disclosed herein, a recurring appointment definition can be modified without deleting the recurring appointment definition and/or losing exceptions, notes, and/or other data associated with the recurring appointment definition. Additionally, the concepts and technologies disclosed herein allow the modification of an existing recurring appointment definition without creating a new recurring appointment definition. Thus, synchronization between rules-based calendaring applications and expansion-based calendaring applications can be accomplished without creating multiple instances of related recurring appointments created due to modifications of the recurring appointment definition.

18 Claims, 8 Drawing Sheets

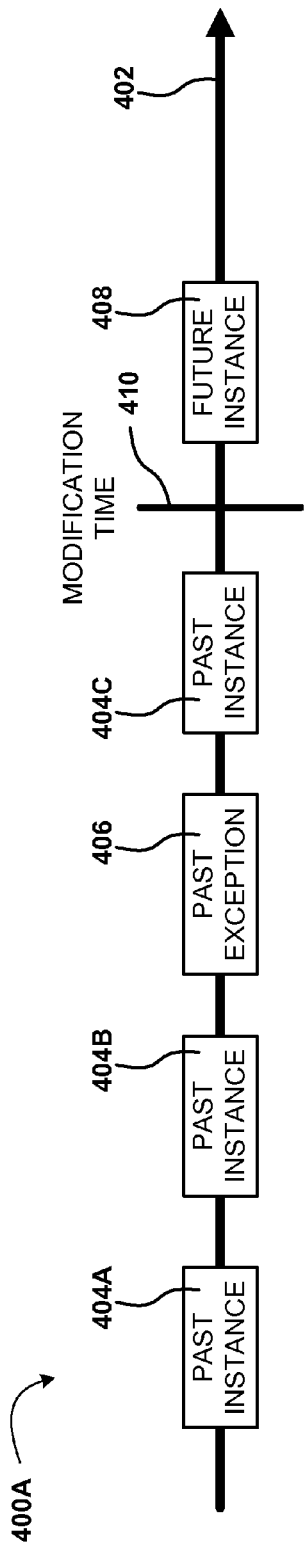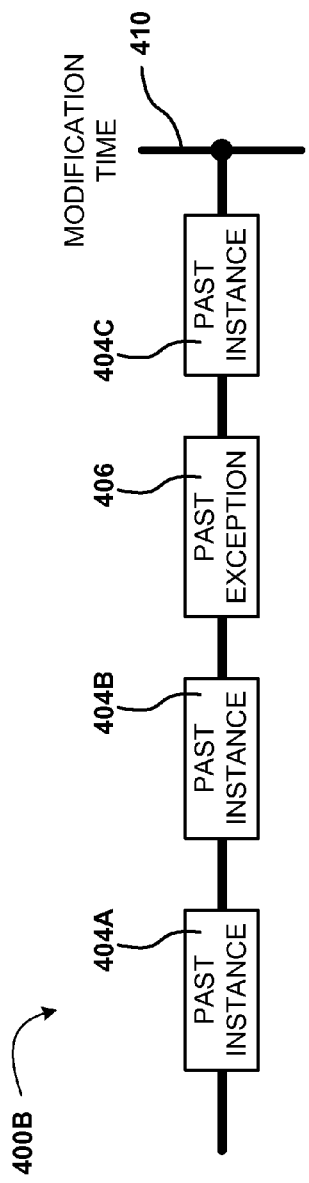
FIG. 4A    FIG. 4B

MANAGING RECURRING APPOINTMENTS

BACKGROUND

Some calendaring applications use a rules-based approach to build and store instances of recurring appointments. In a calendaring application that uses a rules-based approach, a recurring appointment is stored as a rule or definition ("recurring appointment definition") used to build the instances of the recurring appointment. When a request is received to view a calendar during a specified time period, the calendaring application uses the recurring appointment definition to generate and display instances of the recurring appointment during the time period.

Exceptions to a recurring appointment may be stored with the recurring appointment definition. For example, a user who has a recurring appointment scheduled for every Wednesday morning may need or may desire to change one or more instances of the recurring appointment to accommodate personal or business needs. These exceptions can be represented by exception data that describes how the exceptions deviate from the recurring appointment definition. The exception data may be stored or associated with the recurring appointment definition.

In some circumstances, a user may need to modify the recurring appointment. In order to modify recurring appointment definitions, some rules-based calendaring software creates a new recurring appointment definition and deletes the original recurring appointment definition. Because the exception data described above is stored or associated with the original recurring appointment definition, past exceptions, as well as other notes or data associated with past appointments and/or exceptions ("historical data"), may be deleted with the original recurring appointment definition. Thus, important information associated with the original recurring appointment may be lost when modifying recurring appointments using rules-based calendaring software.

Additionally, modification of a recurring appointment definition may create complications with respect to synchronization between rules-based calendaring applications and server-based calendaring applications that store all instances of recurring appointments as individual events ("expansion-based calendaring applications"). If a recurring appointment definition utilized by rules-based calendaring software is synchronized with an expansion-based calendaring application and later modified, the calendar maintained by the expansion-based calendaring application may be populated with instances of the previous version of the recurring appointment, as well as instances of the new version of the recurring appointment.

It is with respect to these and other considerations that the disclosure made herein is presented.

SUMMARY

Concepts and technologies are described herein for managing recurring appointments without losing historical data associated with the recurring appointments. In accordance with the concepts and technologies disclosed herein, a recurring appointment definition can be modified without deleting the recurring appointment definition and/or losing exceptions, notes, and/or other data associated with the recurring appointment definition. Additionally, the concepts and technologies disclosed herein allow the modification of an existing recurring appointment definition without creating a new recurring appointment definition. Thus, synchronization between rules-based calendaring applications and expansion-based calendaring applications can be accomplished without creating multiple instances of related recurring appointments created due to modifications of the recurring appointment definition.

According to one aspect, a customer relationship management ("CRM") server executes a calendar application, a recurrence engine, and a synchronization engine. The CRM server receives a recurring appointment definition from a client device communicating with the CRM server via a web-based client, a stand-alone application and/or a synchronized desktop application. The CRM server is configured to generate instances of the recurring appointment that is defined by the recurring appointment definition, and to store the instances at a data storage device.

According to another aspect, the CRM server applies settings to the recurring appointment definition when generating instances of the recurring appointment. The settings can define, for example, a number of initial instances of the recurring appointment to generate, a number of past instances or a period of time in the past for which to generate instances of the recurring appointment, a number of instances to generate synchronously, a number of instances to generate asynchronously, and/or a number of future instances of the recurring appointment that should be maintained on a calendar at any given time. The CRM server can apply the settings and/or other parameters to ensure that a number of past and future instances of the recurring appointment are available at any particular time, and/or that instances of the recurring appointment over a specified time frame are reflected on the calendar.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a data structure diagram that schematically illustrates aspects of a method for modifying recurring appointments without losing past history associated with the modified recurring appointment, according to an exemplary embodiment.

DETAILED DESCRIPTION

Figure 1:
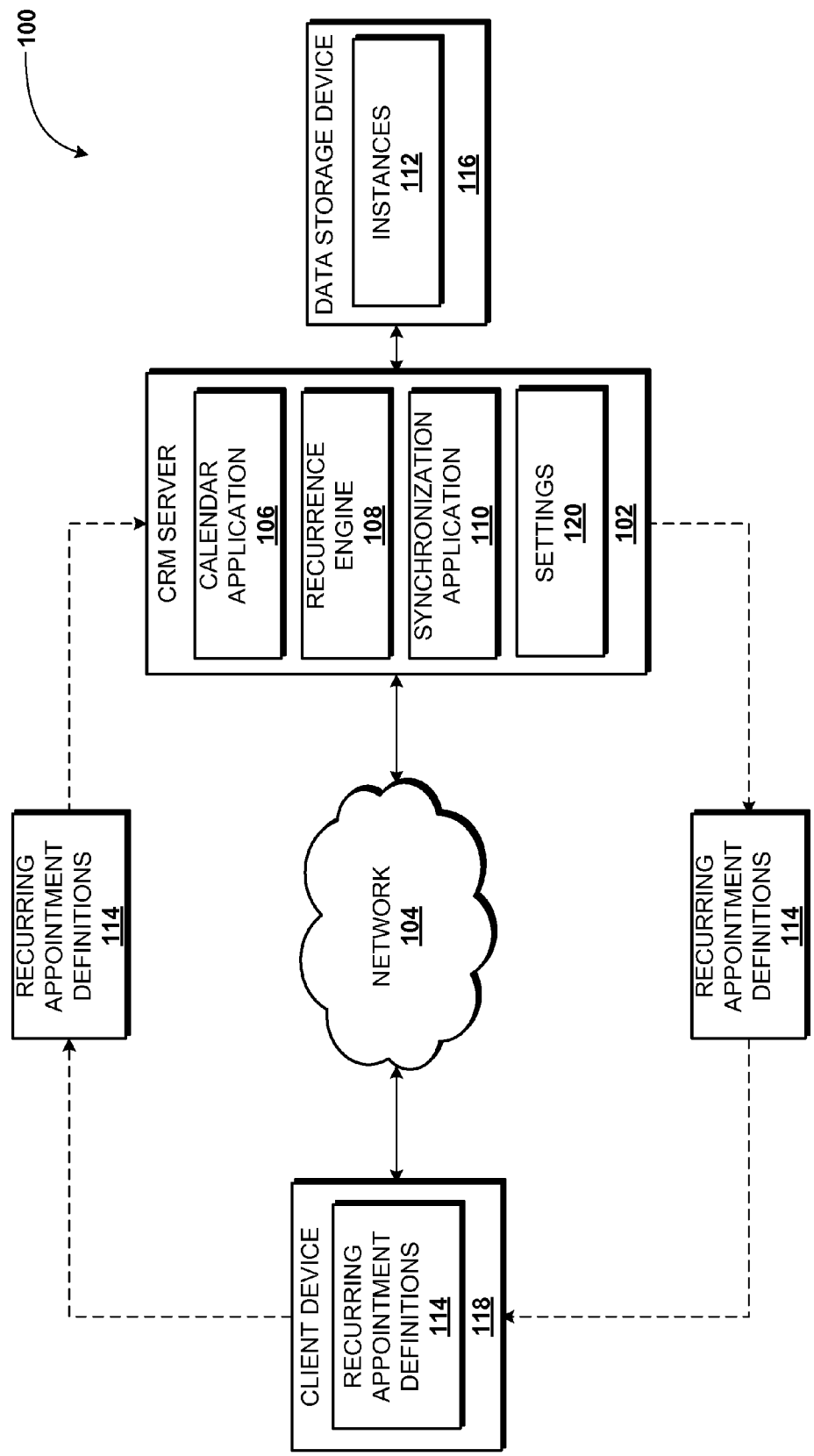
FIG. 1 is a system diagram illustrating an exemplary operating environment for the various embodiments disclosed herein.

The following detailed description is directed to concepts and technologies for managing recurring appointments. According to the concepts and technologies described herein, a recurring appointment definition can be modified without deleting the recurring appointment definition and/or losing exceptions, notes, and/or other data associated with the recurring appointment definition. Additionally, the concepts and technologies disclosed herein allow the modification of an existing recurring appointment definition without creating a new recurring appointment definition. Thus, synchronization between rules-based calendaring applications and expansion-based calendaring applications can be accomplished without creating multiple instances of related recurring appointments created due to modifications of the recurring appointment definition.

In some embodiments disclosed herein, a CRM server executes a calendar application, a recurrence engine, and a synchronization engine. The CRM server receives a recurring appointment definition from a client device communicating with the CRM server via a web-based client, a stand-alone application and/or a synchronized application. The CRM server generates instances of the recurring appointment that is defined by the recurring appointment definition, and stores the instances at a data storage device.

During generation of the instances of the recurring appointment, the CRM server can apply settings or parameters that affect how many instances of the recurring appointment are generated, as well as one or more time periods associated with the generated instances. In some embodiments, the settings define a number of initial instances of the recurring appointment that are generated by default, a number of past instances or a period of time in the past for which instances of the recurring appointment are generated, and/or a number of future instances or a period of time in the future for which instances of the recurring appointment are maintained on a calendar at any given time. The settings also may define a number of instances that are generated synchronously, and/or a number of instances that are generated asynchronously. According to some embodiments, the CRM server applies the settings to help ensure that a number of instances of the recurring appointment are available at any particular time, and/or that instances of the recurring appointment over a specified time frame are reflected on the calendar.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for managing recurring appointments will be presented.

Referring now to FIG. 1, aspects of one operating environment 100 for the various embodiments presented herein will be described. The operating environment 100 shown in FIG. 1 includes a customer relationship management ("CRM") server 102 operating on or in communication with a network 104. The CRM server 102 is configured to execute an operating system (not illustrated) and one or more application programs such as, for example, a calendar application 106, a recurrence engine 108, a synchronization application 110, and/or other application programs.

The operating system is a computer program for controlling the operation of the CRM server 102. The application programs are executable programs configured to execute on top of the operating system to provide the functionality described herein. Although the calendar application 106, the recurrence engine 108, and the synchronization application 110 are illustrated as components of the CRM server 102, it should be understood that each of these components, or combinations thereof, may be embodied as or in stand-alone devices or components thereof operating on or in communication with the network 104 and/or the CRM server 102. For example, in some embodiments, the functionality of the synchronization application 110 is provided by one or more synchronization servers operating in communication with the CRM server 102. Thus, the illustrated embodiment is exemplary, and should not be construed as being limiting in any way.

The calendar application 106 is configured to generate instances of a recurring appointment 112 ("instances") based upon received recurring appointment definitions 114. In some embodiments, the calendar application 106 generates the instances 112 of the recurring appointment definition 114 as one-time appointments. In other embodiments, the calendar application 106 generates the instances 112 and associates the instances 112 with one another using any appropriate data association method including, but not limited to, designating a similar or identical data identifier for each of the instances 112, and/or other methods.

As will be explained in more detail below, the CRM server 102 can store the instances 112 at a data storage device 116. Additionally, the recurring appointment definition 114 can be stored at, generated by, and/or received from a client device 118 operating on or in communication with the network 104. The calendar application 106 also can retrieve the instances 112 from the data storage device 116, and generate one or more recurring appointment definitions 114 corresponding to the instances 112 for synchronization purposes.

The calendar application 106 and/or another component of the CRM server 102 can be configured to interface with a user to support recurring appointment creation or modification. In some embodiments, for example, the CRM server 102, or a component thereof, is configured to generate and present one or more input forms to a user communicating with the CRM server 102 via the network 104. Additionally, as mentioned above, the calendar application 106 can be configured to store the instances 112 at the data storage device 116 in an appropriate format. It should be understood, therefore, that the CRM server 102 supports communications and data operations in multiple languages and/or protocols including, but not limited to, structured query language ("SQL"), hyper-text transfer protocol ("HTTP"), extensible markup language ("XML"), JAVA, JAVASCRIPT, C++, C#, C, active server pages ("ASP"), variants and combinations thereof, and the like.

The recurrence engine 108 can be configured to apply settings or other parameters 120 ("settings") to the recurring appointment definition 114 during generation of the instances 112. As will be described in more detail below with reference to FIG. 3, the recurrence engine 108 applies the settings 120 to the recurring appointment definition 114 to control how many instances 112 of a recurring appointment are generated, and/or a time period during which the instances 112 are generated. In some embodiments, the received recurring appointment definition 114 corresponds to a modified recurring appointment definition 114. If the recurring appointment definition 114 received by the CRM server 102 corresponds to a modified recurring appointment definition 114, the recurrence engine 108 and/or another component of the CRM server 102 can apply various operations to modify the corresponding recurring appointment definition 114 without losing historical data associated with the recurring appointment.

The recurrence engine 108 also can be configured to provide validation of received recurring appointment definitions 114. Upon receiving a recurring appointment definition 114, the recurrence engine 108 determines if the specified recurring appointment is valid. For example, if the recurring appointment definition 114 specifies a recurring appointment that begins on Feb. 29, 2010, the recurrence engine 108 may determine that an error exists in the recurring appointment definition 114, since 2010 is not a leap year. The recurrence engine 108 can prompt a user for corrected input, or can modify the recurring appointment definition 114 based upon preferences, modification rules, and/or other considerations, if desired. Other validation operations are possible, and are contemplated.

The synchronization application 110 can be configured to support synchronization operations between the client device 118 and the CRM server 102. More particularly, the synchronization application 110 is configured to convert recurring appointment definitions 114 into the instances 112, and to convert the instances 112 into recurring appointment definitions 114. Thus, the CRM server 102 can receive the recurring appointment definitions 114 and generate and store the instances 112 based upon the recurring appointment definitions 114. Similarly, the CRM server 102 can receive the instances 112, generate recurring appointment definitions 114 based upon the instances 112, and transmit the recurring appointment definitions to the client device 118.

As mentioned above, the client device 118 may execute a calendaring application (not illustrated) that employs a rules-based approach to defining recurring appointments, while the CRM server 102 may define each instance 112 of a recurring appointment as an individual appointment. The synchronization application 110 is configured to support synchronization of the recurring appointment definitions 114 at the client device 118 and the instances 112 at the data storage device 116 without causing deletion or other modification of historical data associated with the corresponding recurring appointments and/or instances 112 thereof.

In some embodiments, the functionality of the synchronization application 110 is provided by one or more servers executing the MICROSOFT EXCHANGE SERVER software from MICROSOFT CORPORATION. It other embodiments, the functionality of the synchronization application 110 is provided by other devices executing software from other vendors. The synchronization application 110 can perform synchronization operations during, or in response to, modifications of the recurring appointment definition 114 and/or the instances 112. The synchronization application 110 also is configured to support asynchronous updates of the recurring appointment definitions 114 and/or the instances 112. For purposes of the specification and claims, "asynchronous updates" is used to refer to modifications made to recurring appointment definitions 114 and/or the instances 112 while the CRM sever 102 and/or the client device 118 are off-line, i.e., not connected to one another.

While the illustrated embodiment describes the client device 118 as providing calendaring services using a rules-based approach and describes the CRM server 102 as providing calendaring services using an expansion-based approach, it should be understood that the illustrated configuration is exemplary. In some embodiments, the client device 118 provides calendaring services using an expansion based approach, and the CRM server 102 provides calendar services using a rules based approach. Thus, the illustrated embodiment should not be construed as being limiting in any way.

The data storage device 116 mentioned above may include, but is not limited to, one or more databases, server computers, desktop computers, mobile telephones, laptop computers, other computing systems, and the like. In the illustrated embodiments, the data storage device 116 is an SQL server configured to operate on or in communication with the network 104 and/or the CRM server 102. The data storage device 116 stores or hosts the instances 112 for use by the calendar application 106. The instances 112 may be retrieved by the CRM server 102 for providing calendaring services, and/or the client device 118 via the synchronization application 110 during synchronization operations.

According to various embodiments, the client device 118 is a personal computer ("PC") such as a desktop, tablet, or laptop computer system. The client device 118 may include other types of computing systems including, but not limited to, server computers, handheld computers, netbook computers, embedded computer systems, personal digital assistants, mobile telephones, smart phones, or other computing devices. The client device 118 is configured to execute one or more applications to provide a user of the client device 118 with a calendaring service, and/or to allow communications between the client device 118 and the CRM server 102.

In some embodiments, the client device 118 executes a calendaring application such as a member of the OUTLOOK family of calendaring applications from MICROSOFT CORPORATION, and is configured to synchronize the recurring appointment definitions 114 stored at the client device 118 with instances 112 stored at the data storage device 116 and/or the CRM server 102 in communication therewith. In other embodiments, the client device 118 executes a web browser for accessing a web-based calendaring application hosted by the CRM server 102. Thus, the client device 118 generates the recurring appointment definitions 114 via execution of the calendaring application or via communication with another device that executes one or more calendaring applications such as the calendar application 106.

FIG. 1 illustrates one CRM server 102, one network 104, one data storage device 116, and one client device 118. It should be understood, however, that some implementations of the operating environment 100 include multiple CRM servers 102, multiple networks 104, multiple data storage devices 116, and/or multiple client devices 118. Therefore, the illustrated embodiment should be understood as being exemplary, and should not be construed as being limiting in any way.

Figure 2:
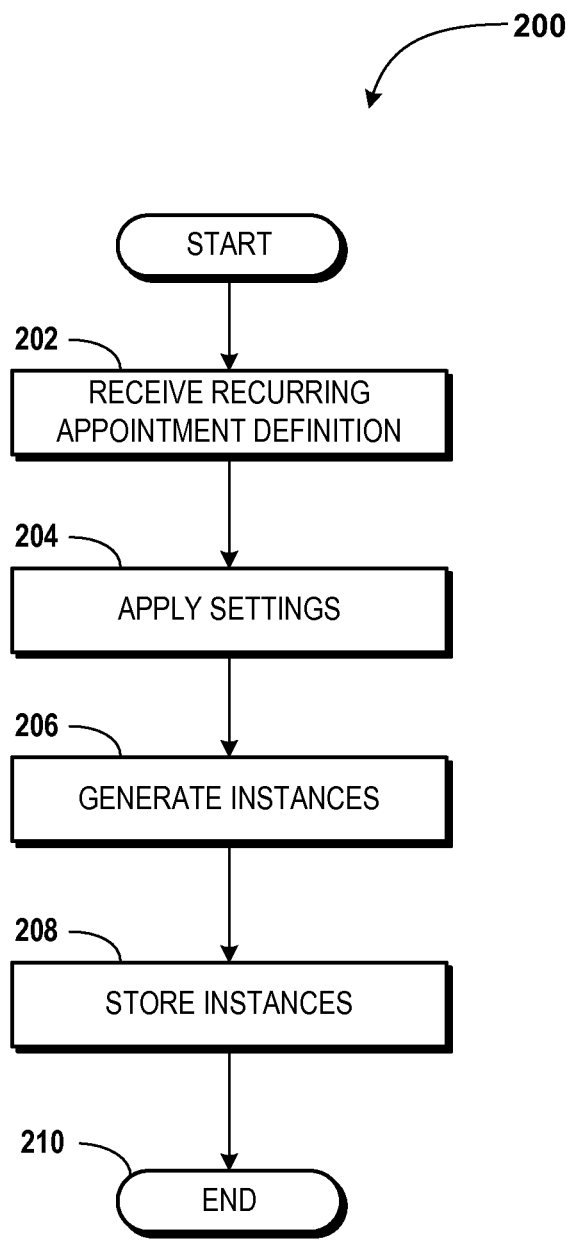
FIG. 2 is a flow diagram showing aspects of a method for generating a recurring appointment, according to an exemplary embodiment.

Turning now to FIG. 2, aspects of a method 200 for creating a recurring appointment will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined above. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the CRM server 102. It should be understood that these embodiments are exemplary, and should not be viewed as being limiting in any way. The method 200 begins at operation 202, wherein the CRM server 102 receives a recurring appointment definition 114. The recurring appointment definition 114 can be received from the client device 118 and can correspond to a rules-based definition of a recurring appointment. By way of example, the recurring appointment definition 114 may specify a start date of the recurring appointment, an end date for the recurring appointment, a number of instances of the recurring appointment, a day of the week for the recurring appointment, a day of the month for the recurring appointment, a start time for the recurring appointment, an end time for the recurring appointment, attendees for the recurring appointment, a week of the month for the recurring appointment, other aspects of the recurring appointment, combinations thereof, and the like.

From operation 202, the method 200 proceeds to operation 204, wherein the CRM server 102 applies the settings 120 to the received recurring appointment definition 114 to expand the recurring appointment definition 114 into a number of instances 112 of the recurring appointment. The settings 120 applied in operation 204 include one or more parameters set by a user, an administrator, and/or another authorized entity for controlling the functionality of the CRM server 102. In some embodiments, the parameters include, but are not limited to, an initial instances parameter, a future window parameter, a past window parameter, and/or other parameters.

The initial instances parameter may be used to specify a number of instances 112 of recurring appointments to generate when a recurring appointment definition 114 received by the CRM server 102 is used to generate the instances 112. The initial instances parameter can be any desired number. The value of the initial instances parameter can be set based upon performance considerations, user preferences, or other considerations.

More particularly, processing resources of the CRM server 102 may be consumed during generation of the instances 112. Furthermore, storage of the generated instances 112 may require communications between the CRM server 102 and the data storage device 116, if the data storage device 116 is embodied as a separate device, and/or consumption of a local storage device if the data storage device 116 is embodied as part of the CRM server 102. Therefore, generation of a large number of instances 112 may consume processing and/or storage resources of the CRM server 102 and may adversely affect performance of the CRM server 102. The initial instances parameter, as well as other settings and/or parameters, may be used to balance the desire for as much calendar information as possible with the desire for the CRM server 102 to perform as well as possible.

The future window parameter may be used to specify a number of future instances 112 of the recurring appointment definition 114 that should be generated by the CRM server 102. In some embodiments, the future window parameter specifies a number of future instances 112 of a recurring appointment definition 114 that should be represented at any particular time on a calendar, or a period of time in the future for which instances 112 of a recurring appointment definition 114 should be represented on the calendar. The future window parameter may be set based upon several considerations. For example, each instance 112 of a recurring appointment may be stored by the CRM server 102 as an individual event. Thus, the considerations used to define the future window parameter can include CRM server 102 performance considerations, as generation, maintenance, and storage of the instances 112 of a recurring appointment definition 114 may result in consumption of CRM server 102 processing and storage resources.

A desire for optimal performance of the CRM server 102, however, may be offset or otherwise adjusted by a desire to populate a calendar with as much data as possible. Additionally, the desire to populate the calendar and the desire to improve the performance of the CRM server 102 further may be balanced, offset, or otherwise adjusted with a desire to avoid creating instances 112 of recurring appointments that may be subject to later change. For example, a recurring appointment definition 114 may be changed at some time after creation of the recurring appointment definition 114. When the recurring appointment definition 114 is modified, future instances 112 of the recurring appointment likely will need to be deleted or modified. Thus, during generation of future instances 112 of a recurring appointment, the CRM server 102 may generate, store, and/or manipulate data that eventually becomes obsolete or inaccurate. The future window parameter may be used to limit the number of future instances created.

The past window parameter may be used to specify a number of instances 112 in the past, and/or a time limit in the past, for which instances 112 of a recurring appointment definition 114 are generated by the CRM server 102. The past window parameter, therefore, can be used to limit the number of instances 112, and/or a date range in the past during or for which instances 112 of a recurring appointment definition 114 that are generated and stored by the CRM server 102. The past window parameter can be set to any desired past time or date range, and/or any number of past instances 112, depending upon user preferences.

It should be understood that the past window parameter can be changed at any time by a user of the CRM server 102. Thus, for example, if a user migrates his or her calendar information from a rules-based calendaring application to an expansion-based calendaring application, the past window parameter may be set to a first time range and/or a first number of occurrences to capture more past instances 112 of a recurring appointment definition 114 than may be captured if the past window parameter is set to a relatively shorter time range or smaller number of instances 112. Similarly, a user may decide to shorten or reduce the period of time or number of instances 112 of a recurring appointment definition 114 that are generated by the CRM server 102. Thus, the value of the past window parameter can be varied at any time and for any reason.

The past window parameter allows the recurring appointment definition 114 to be expanded into the instances 112 without necessarily populating a calendar with past instances 112 of recurring appointments. The ability to limit the creation of past instances 112 can be particularly powerful for long-running recurring appointments the expansion or synchronization of which may otherwise result in the creation of many past instances 112 of the recurring appointment. The past window parameter can limit how many of these instances 112 are expanded or synchronized and/or a time frame over which these instances 112 are expanded or synchronized. Additionally, closed recurring appointments that will not result in creation of any instances 112 within the past window can be ignored during synchronization and/or expansion, as is explained in more detail below with reference to FIG. 5.

From operation 204, the method 200 proceeds to operation 206, wherein the CRM server 102 generates the instances 112 of the recurring appointment definition 114. It should be understood that the CRM server 102 can generate the instances 112 of the recurring appointment definition 114 according to the settings 120 mentioned above, as well as according to other considerations. From operation 206, the method 200 proceeds to operation 208, wherein the CRM server 102 stores the instances 112 of the recurring appointment definition 114 at a data storage location such as, for example, the data storage device 116. The method 200 ends at operation 210.

Although not illustrated in FIG. 2, the recurring appointment definition 114 used to generate the instances 112 can be stored at the data storage device 116. The recurring appointment definition 114 can be used to generate additional instances 112 of the recurring appointment definition 114. For example, the CRM server 102 may generate instances 112 of the recurring appointment definition 114 according to a schedule, based upon an explicit request, when a desired number of instances 112 are no longer present on a calendar, or the like. Thus, the operations of method 200 can be repeated periodically, if desired.

Figure 3:
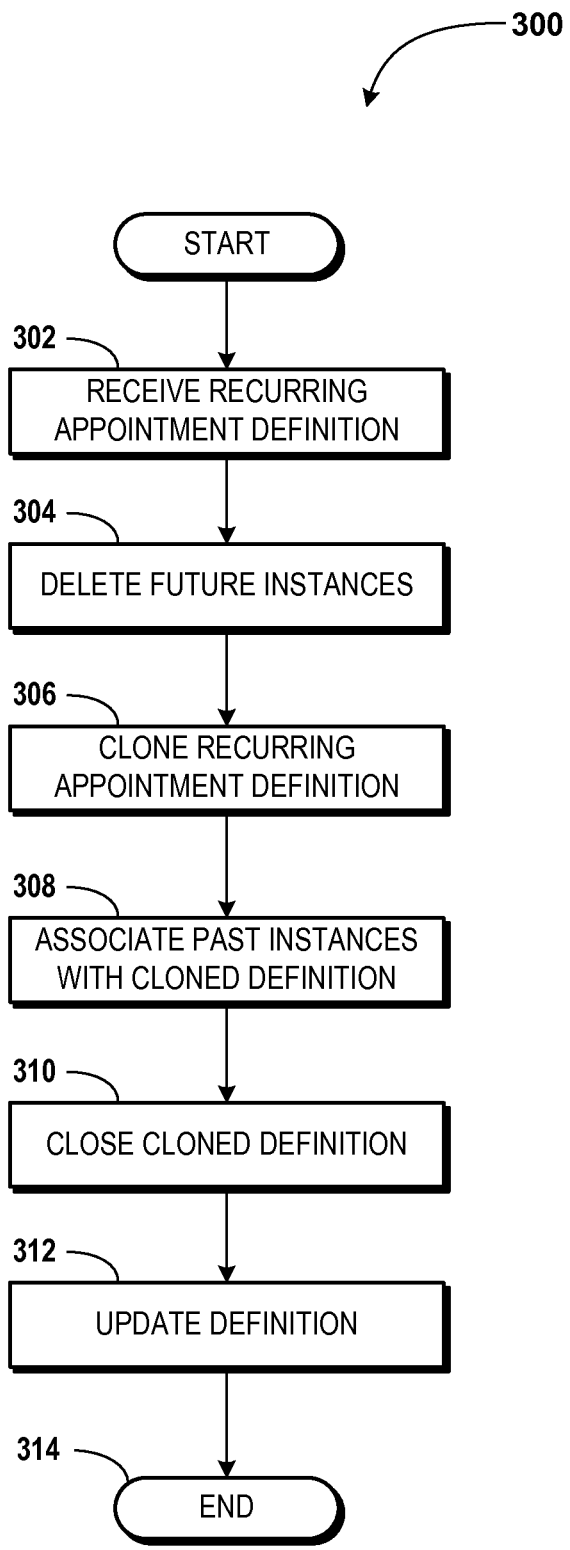
FIG. 3 is a flow diagram showing aspects of a method for modifying a recurring appointment, according to an exemplary embodiment.

Turning now to FIG. 3, aspects of a method 300 for modifying a recurring appointment will be described in detail. The method 300 begins at operation 302, wherein the CRM server 102 receives the recurring appointment definition 114. The received recurring appointment definition 114 can be received during a synchronization operation between the CRM server 102 and the client device 118, and/or data received during an online communication between the CRM server 102 and the client device 118. As mentioned above, the recurring appointment definition 114 can be changed and synchronized during an online session, or can be changed when the client device 118 is offline, and later synchronized with the CRM server 102. Thus, operation 302 also may include or may be preceded by the receipt of an update message or other information at the CRM server 102. The update message or other information can indicate that a recurring appointment definition 114 has been changed at the client device 118 and/or may prompt the CRM server 102 to receive or obtain the updated recurring appointment definition 114.

From operation 302, the method 300 proceeds to operation 304, wherein the CRM server 102 deletes any future instances of the recurring appointment associated with the recurring appointment definition 114 received in operation 302. For purposes of this description and the claims, "future instances" of the recurring appointment include any instances 112 of the recurring appointment that have not occurred as of the moment the recurring appointment definition 114 is modified. It should be understood that an option to delay modification of the recurring appointment until after a next instance 112 occurs, or until an effective date, can be provided to a user communicating with the CRM server 102, if desired.

From operation 304, the method 300 proceeds to operation 306, wherein the CRM server 102 creates a cloned version of the recurring appointment definition 114 used to generate the instances 112 of the recurring appointment deleted in operation 304. In operation 306, all aspects of the recurring appointment definition 114 are copied to create the cloned version of the recurring appointment definition 114. It should be understood that after operation 306, there are two identical versions of the recurring appointment definition 114.

From operation 306, the method 300 proceeds to operation 308, wherein the CRM server 102 associates past instances 112 of the recurring appointment definition 114 with the cloned version of the recurring appointment definition 114. Thus, any past exceptions of the recurring appointment, as well as any notes or other information stored with the past instances 112, are stored with the cloned recurring appointment definition 114. As will be explained in more detail below, these past exceptions and other data will not be lost when the original version of the recurring appointment definition 114 is modified.

From operation 308, the method 300 proceeds to operation 310, wherein the CRM server 102 closes or ends the cloned version of the recurring appointment definition 114 at the moment the changes to the recurring appointment definition 114 were received, as described in operation 302 above. In some embodiments, the cloned version of the recurring appointment definition 114 is closed or ended by moving the end date of the recurring appointment definition 114 to the moment at which the changes to the recurring appointment definition 114 were received. All past instances 112 of the recurring appointment, as well as all exceptions and information associated with the recurring appointment, can be stored with the cloned version of the recurring appointment definition 114.

From operation 310, the method 300 proceeds to operation 312, wherein the recurring appointment definition 114 is updated to reflect the changes received in operation 302. For example, the recurring appointment definition 114 can be modified to begin at the moment the changes to the recurring appointment definition 114 were received as described in operation 302 above.

In some rules-based calendar applications, modification of recurring appointment definitions 114 may have adverse consequences. For example, when a recurring appointment definition 114 is modified, all past data and exceptions may be lost. In the embodiments described herein, however, the exceptions and/or other data associated with the recurring appointment definition 114 are stored with the cloned version of the recurring appointment definition 114. As such, the exceptions and/or other data are not deleted when the recurring appointment definition 114 is modified.

Similarly, because the recurring appointment definition 114 has been severed from the past instances 112, modifications to the recurring appointment definition 114 will not result in deletion of the past instances 112 and/or data associated with the past instances 112. In some embodiments, cloned versions of recurring appointment definitions 114, are associated with one another such that the user can retrieve all exceptions and/or other data associated with the recurring appointment, even when multiple cloned versions of the recurring appointment definition 114 have been created over time.

Although not illustrated in FIG. 3, the recurring appointment definition 114 can be stored at the data storage device 116 and used in the future to generate additional instances 112 of the recurring appointment definition 114. For example, the CRM server 102 may generate instances 112 of the recurring appointment definition 114 according to a schedule, based upon an explicit request, when a desired number of instances 112 are no longer present on a calendar, or the like. Additionally, the recurring appointment definition 114 can be transmitted to the client device 118 during synchronization, if desired.

While the above method 300 has been described as cloning the recurring appointment definition 114, and associating all past exceptions, instances 112, and/or other data with the cloned version of the recurring appointment definition 114, it should be understood that the past instances 112, exceptions, and/or other data associated with a recurring appointment definition 114 instead may be associated with the recurring appointment definition 114, and the cloned version of the recurring appointment definition 114 can be used to generate the future instances 112 of the recurring appointment. The choice as to which recurring appointment definition 114 should be associated with the past instances 112 can be made based on synchronization needs, performance requirements, and/or other considerations. The method 300 ends at operation 314.

Turning now to FIGS. 4A-4B, the cloning of recurring appointment definitions 114 is schematically illustrated, according to an exemplary embodiment. As shown in FIG. 4A, a first recurring appointment 400A is illustrated. The first recurring appointment 400A is illustrated on a timeline 402, and includes a number of past instances 404A, 404B, and 404C (hereinafter collectively referred to as "past instances 404").

The first recurring appointment 400A also includes a past exception 406, which corresponds to an instance 112 of the recurring appointment 400A that was moved for some reason. The first recurring appointment 400A also includes a future instance 408, an instance 112 of the recurring appointment 400A that has not occurred as of a modification time 410. As described above with reference to FIG. 3, a user may modify the recurring appointment 400A to alter the definition of the recurring appointment. The time at which the recurring appointment definition 114 corresponding to the recurring appointment 400A is modified corresponds to the modification time 410.

In response to receiving a modification of the recurring appointment definition 114 corresponding to the recurring appointment 400A, the CRM server 102 can generate a cloned version of the recurring appointment 400B, as explained above with reference to operation 306 of FIG. 3, and as illustrated in FIG. 4B. The cloned version of the recurring appointment 400B includes all data corresponding to the past instances 404 and the past exception 406 as explained above with reference to operation 308 of FIG. 3. The cloned version of the recurring appointment 400B, however, ends at the modification time 410, corresponding to the time at which the recurring appointment 400A is modified, as explained above with reference to operation 310 of FIG. 3. Also, the future instance 408 has been deleted from the cloned version of the recurring appointment 400B, as explained above with reference to operation 304 of FIG. 3.

The CRM server 102 deletes the past instances 404 of the original recurring appointment 400A, but does not delete the future instance 408 associated with the recurring appointment definition 114. Thus, the recurring appointment definition 114 corresponding to the original recurring appointment 400A has been modified, resulting in a recurring appointment definition 114 corresponding to the modified version of the recurring appointment 400A'.

The recurring appointment 400A' begins at the time 410, and therefore only includes the future instance 408. Although not illustrated in FIG. 4, the cloned version of the recurring appointment 400B and the modified version of the recurring appointment 400A' can be associated with one another using any method of data association including, but not limited to, assigning an identical or related data field in a database that stores the recurring appointment definitions 114 corresponding to the recurring appointments 400B, 400A'. Thus the cloned version of the recurring appointment definition 114 corresponding to the recurring appointment 400B and the recurring appointment definition 114 corresponding to the modified version of the recurring appointment 400A' can be retrieved and/or analyzed together.

Figure 5:
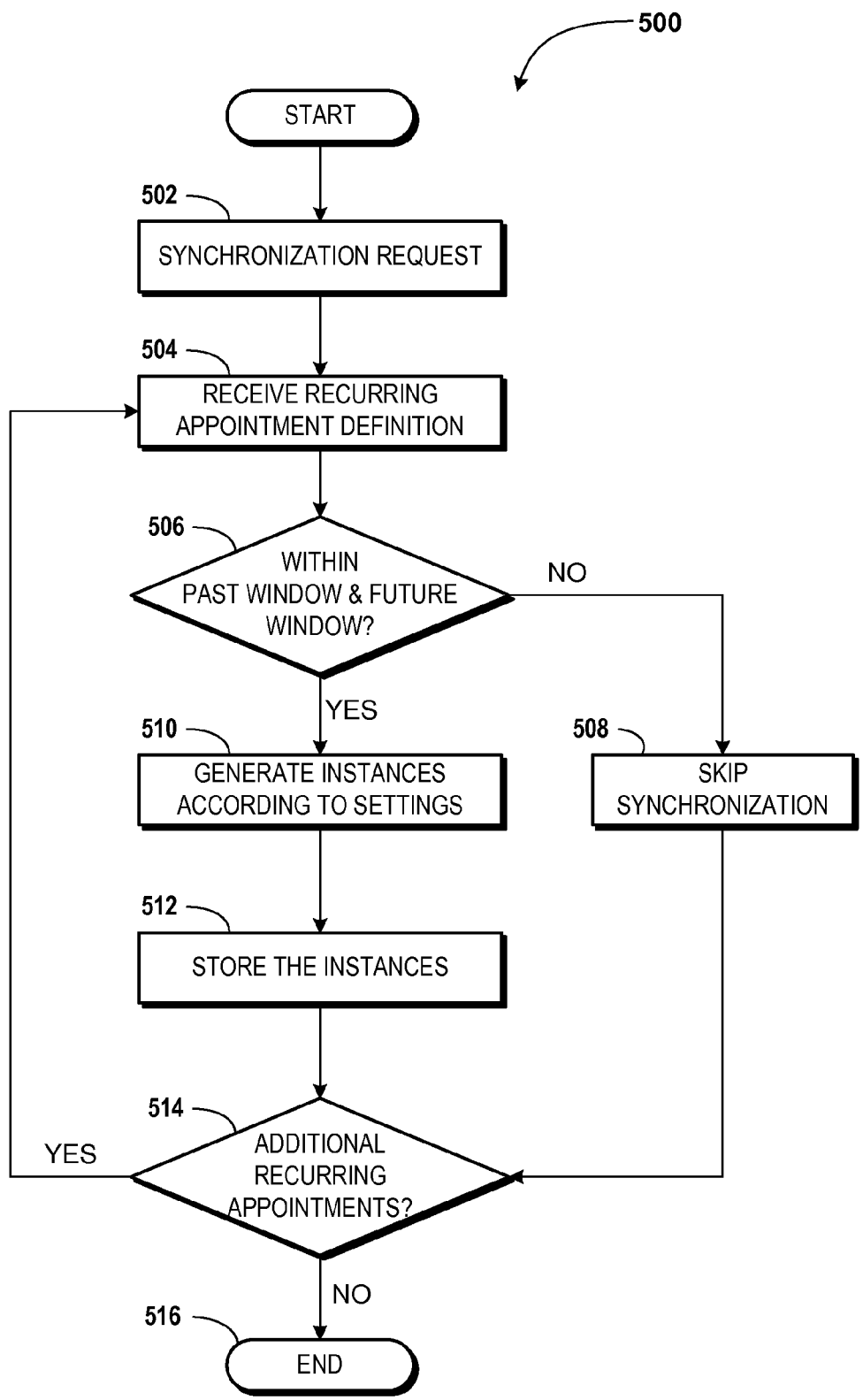
FIG. 5 is a flow diagram showing aspects of a method for synchronizing recurring appointments, according to an exemplary embodiment.

Turning now to FIG. 5, aspects of a method 500 for synchronizing recurring appointments without losing past data associated with the recurring appointments will be described in detail. The method 500 begins at operation 502, wherein a synchronization request is received at the CRM server 102. The synchronization request can be received in a number of ways. The synchronization request can be received when the client device 118 connects to the CRM server 102, at which time calendar information at the CRM server 102 and calendar information at the client device 118 may be synchronized.

Similarly, a user may explicitly request synchronization of the calendar information, if desired. Additionally, a change made to the calendar information stored by either the client device 118 or the CRM server 102 can prompt a synchronization operation. For purposes of illustrating the concepts and technologies disclosed herein, the method 500 is illustrated as being performed upon receiving, at the CRM server 102, an indication that a recurring appointment definition 114 has been modified. It should be understood that this embodiment is exemplary.

From operation 502, the method 500 proceeds to operation 504, wherein the CRM server 102 receives the recurring appointment definition 114. The method 500 proceeds to operation 504, wherein the CRM server 102 determines if any occurrences of the recurring appointment definition 114 exist within the past window and/or the future window as specified by the settings 120. As explained above, the settings 120 can be used to limit the number of instances 112 generated based upon the recurring appointment definition 114. Additionally, the settings 120 may be used to prevent the CRM server 102 from synchronizing certain recurring appointments for which the CRM server 102 will generate no instances 112 within a specified time window.

If the CRM server 102 determines that no instances 112 corresponding to the recurring appointment definition 114 will be generated within a time range corresponding to the past window parameter and/or the future window parameter, the method 500 proceeds to operation 508, and the CRM server 102 skips synchronization of the recurring appointment. If the CRM server 102 determines that at least one instance 112 corresponding to the recurring appointment definition 114 will be generated within a time range corresponding to at least one of the past window parameter and/or the future window parameter, the method 500 proceeds to operation 510, wherein the CRM server 102 generates instances 112 corresponding to the recurring appointment definition 114 according to the settings 120, as explained above with reference to FIG. 2.

From operation 510, the method 500 proceeds to operation 512, wherein the CRM server 102 stores the instances 112. As explained above, the instances 112 can be stored at the data storage device 116. From operation 512, the method proceeds to operation 514, wherein the CRM server 102 determines if additional recurring appointments may be synchronized. If the CRM server 102 determines that additional recurring appointments may be synchronized, the method 500 returns to operation 504, wherein recurring appointment definitions 114 corresponding to the additional recurring appointments are received or obtained, as explained above. If the CRM server 102 determines that no additional recurring appointments remain to be synchronized, the method 500 proceeds to operation 516, whereat the method 500 ends.

Figure 6A:
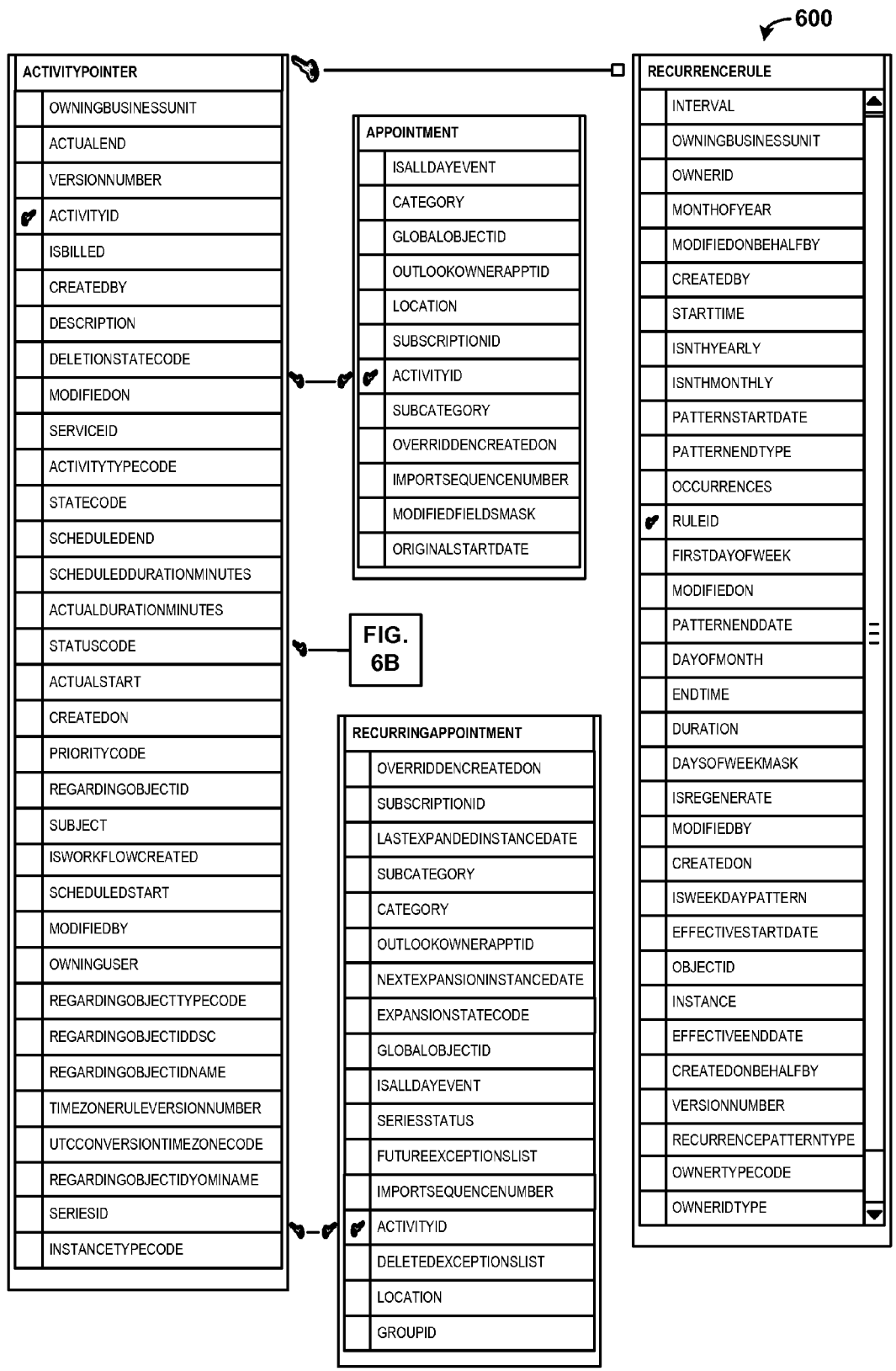
FIGS. 6A-6B are data structure diagrams that schematically illustrates a schema for a data structure configured to store expansion based calendar data, according to an exemplary embodiment.
Figure 6B:
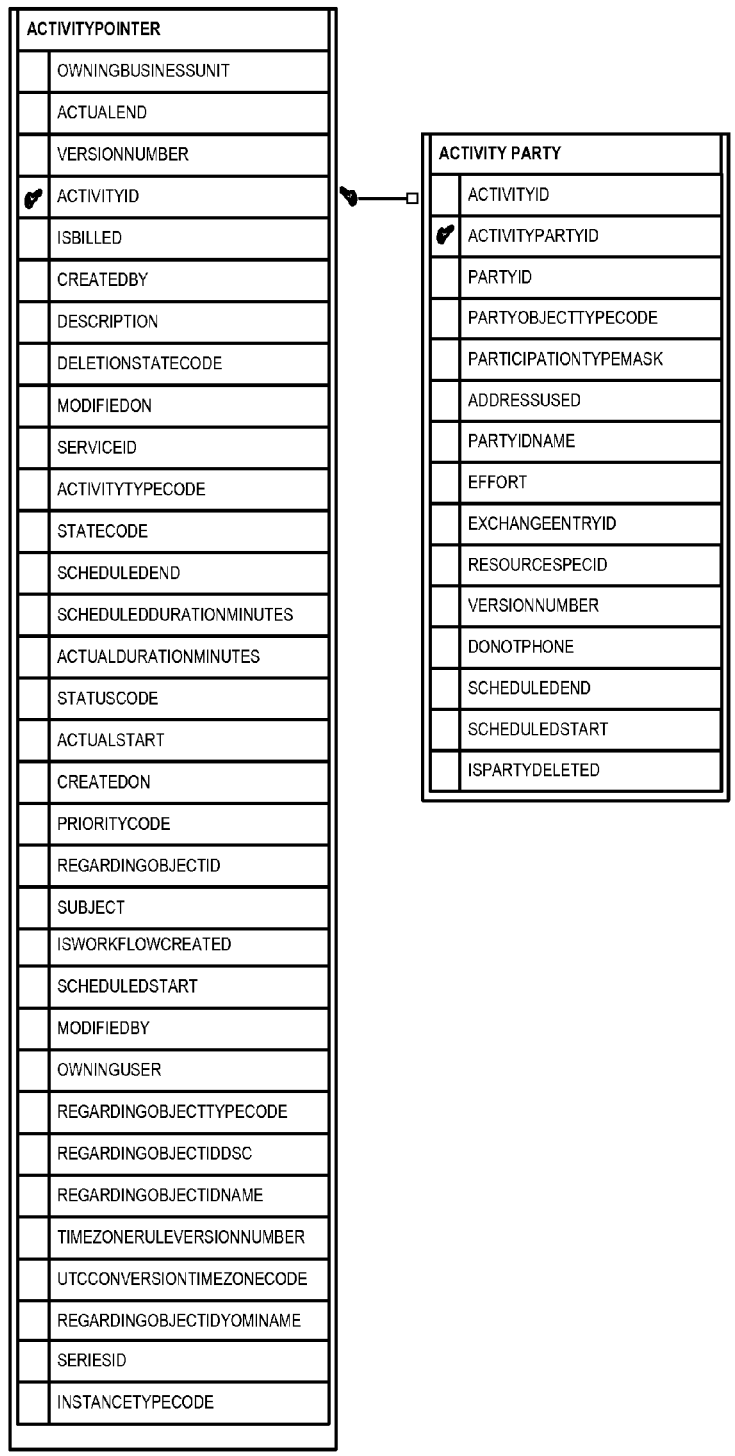

Turning now to FIGS. 6A-6B, an exemplary data schema 600 for a data structure configured to store the instances 112 is illustrated. According to various embodiments, the synchronization operations described above can be completed for various aspects of the recurring appointment definitions 114 and/or the instances 112. Additional settings 120 and/or other parameters can be specified by a user or other authorized entity to determine what aspects of the instances 112 and/or the recurring appointment definitions 114 should be synchronized. Additionally, or alternatively, the settings 120 and/or other parameters can be specified for determining if modifications to certain aspects of the instances 112 and/or the recurring appointment definitions 114 should or should not trigger a synchronization operation. Almost any aspect of the instances 112 and/or the recurring appointment definitions 114 can be synchronized, and/or can trigger a synchronization if modified. Exemplary aspects include almost any field of a data structure that stores the instances 112 and/or the recurring appointment definitions 114.

Thus, it will be understood that the CRM server 102 can be configured to perform a synchronization operation based upon a modification to almost any aspect of the instances 112. The synchronization as disclosed herein can apply to more than the handful of fields typically synchronized for rules-based calendaring services. Additionally, it will be understood that the attendees for an event can be stored as one of the fields in the illustrated schema 600. Thus, it will be appreciated that any changes to the attendees associated with a recurring appointment can trigger a synchronization operation, if desired.

In some embodiments, the attendees for a particular recurring appointment can be associated with the recurring appointment definition 114. In other embodiments, the attendees for the recurring appointment can be associated with each instance 112 of the recurring appointment. Associating the attendees with each instance 112 of the recurring appointment allows changes to the attendees to be made for each instance 112, without affecting the recurring appointment definition 114. Additionally, associated the attendees with each instance 112 of the recurring appointment can help prevent creation of a new recurring appointment definition 114 if the attendees associated with the recurring appointment need to be modified for any reason, which otherwise may result in creation of a new recurring appointment definition 114 and deletion or loss of historical data associated with the original recurring appointment definition 114.

For large numbers of attendees, however, the load on the CRM server 102 resulting from associating the attendees with each instance 112 may outweigh the benefits of this convenience. Thus, the choice as to whether to associate attendees with the recurring appointment definition 114, or to associate attendees with the instances 112 of the recurring appointment can be based upon performance or other considerations.

According to various embodiments, the CRM server 102, or one or more components thereof, can support synchronization between the instances 112 associated with the CRM server 102 with the recurring appointment definitions 114 associated with the client device 118. In some embodiments, each instance 112 is converted into a recurring appointment definition 114, as opposed to being represented as instances 112 of one recurring appointment definition 114. Thus, the CRM server 102 can be configured to generate a recurring appointment definition 114 corresponding to each instance 112 of the recurring appointment, and can synchronize the recurring appointment definitions 114 generated by the CRM server 102 with the recurring appointment definitions 114 stored at the client device 118. It should be understood that the illustrated schema 600 is exemplary, and that the additional or alternative information can be stored according to various embodiments.

Figure 7:
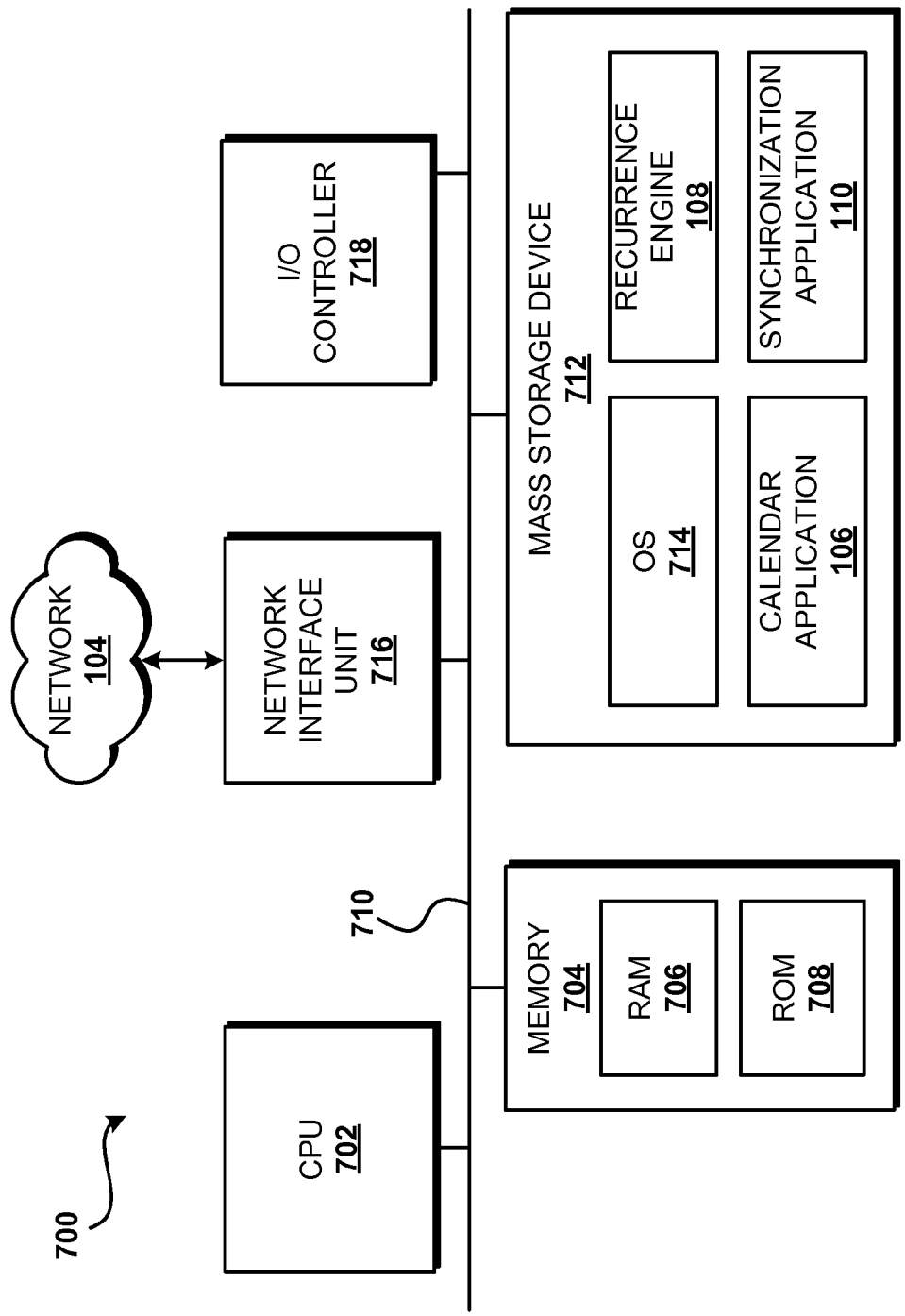
FIG. 7 is a computer architecture diagram illustrating an exemplary computer hardware and software architecture for a computing system capable of implementing aspects of the embodiments presented herein.

FIG. 7 illustrates an exemplary computer architecture 700 for a device capable of executing the software components described herein for creating, modifying, and synchronizing recurring appointments. Thus, the computer architecture 700 illustrated in FIG. 7 illustrates an architecture for a server computer, mobile phone, a PDA, a smart phone, a server computer, a desktop computer, a netbook computer, a tablet computer, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing the operating system 714, the calendar application 106, the recurrence engine 108, and the synchronization application 110. Although not shown in FIG. 7, the mass storage device 712 also can be configured to store instances 112 and/or the recurring appointment definitions 114, desired.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a hard disk or CD-ROM drive, it should be appreciated by those skilled in the art that computer-readable media can be any available computer storage media that can be accessed by the computer architecture 700.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of this specification and the claims, the phrase "computer-readable storage medium" and variations thereof, does not include waves, signals, and/or other transitory and/or intangible communication media.

According to various embodiments, the computer architecture 700 may operate in a networked environment using logical connections to remote computers through a network such as the network 104. The computer architecture 700 may connect to the network 104 through a network interface unit 716 connected to the bus 710. It should be appreciated that the network interface unit 716 also may be utilized to connect to other types of networks and remote computer systems, for example, the client device 118. The computer architecture 700 also may include an input/output controller 718 for receiving and processing input from a number of other devices, including a keyboard, mouse, or electronic stylus (not shown in FIG. 7). Similarly, the input/output controller 718 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

Based on the foregoing, it should be appreciated that technologies for managing recurring appointments have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for managing a recurring appointment, the computer-implemented method comprising performing computer-implemented operations for:
   receiving a recurring appointment definition from a client device, the recurring appointment definition comprising a definition of the recurring appointment;
   applying at least one setting to the recurring appointment definition, the at least one setting defining how the recurring appointment definition is expanded to generate one or more instances of the recurring appointment;
   generating the one or more instances of the recurring appointment according to at least one of the at least one settings;
   storing the one or more instances at a data storage device;
   receiving an updated recurring appointment definition from the client device, the updated recurring appointment definition comprising a new definition of the recurring appointment corresponding to the recurring appointment definition;

deleting future instances of the recurring appointment;

cloning the recurring appointment definition associated with the recurring appointment to create a cloned version of the recurring appointment definition;

associating past instances corresponding to the recurring appointment with the cloned version of the recurring appointment definition;

closing the cloned version of the recurring appointment definition; and updating the recurring appointment definition to reflect the new definition of the recurring appointment.

2. The method of claim 1, wherein the at least one setting comprises an initial instances parameter defining how many instances of the recurring appointment should be initially generated, a past window parameter that limits how many past instances of the recurring appointment are generated, and a future window parameter that limits the number of future instances of the recurring appointment that are generated.

3. The method of claim 1, wherein at least one of the recurring appointment definition or the updated recurring appointment definition is received from a web client.

4. The method of claim 1, wherein at least one of the recurring appointment definition or the updated recurring appointment definition is received from a personal computer executing a rules-based calendaring application.

5. The method of claim 1, wherein the updated recurring appointment definition comprises data indicating a new start date for the recurring appointment.

6. The method of claim 5, wherein the new start date of the recurring appointment comprises a time at which the updated recurring appointment definition is received from the client device.

7. The method of claim 6, wherein closing the cloned version of the recurring appointment definition comprises moving the end date of the cloned version of the recurring appointment definition to the new start date of the recurring appointment.

8. The method of claim 7, further comprising calculating at least one future instance of the recurring appointment based upon the new recurring appointment definition.

9. The method of claim 1, further comprising:

receiving a request to synchronize an updated version of the recurring appointment definition with the instances;

determining if the updated version of the recurring appointment definition specifies a recurring appointment for which at least one instance occurs during a past window or a future window; and generating at least one instance of the recurring appointment and storing the instance at the data storage device, in response to determining that at least one instance occurs during the past window or the future window.

10. The method of claim 9, further comprising skipping synchronization of the updated version of the recurring appointment definition, in response to determining that no instance of the recurring appointment occurs during the past window or the future window.

11. The method of claim 9, wherein the at least one setting specifies what aspects of the instances and the recurring appointment definition are synchronized during the synchronization.

12. The method of claim 9, wherein the number of instances generated are limited by at least one of the past window or the future window.

13. A computer-implemented method for managing a recurring appointment, the computer-implemented method comprising performing computer-implemented operations for:

receiving a recurring appointment definition from a client device, the recurring appointment definition comprising a definition of the recurring appointment;

applying settings to the recurring appointment definition, the settings comprising at least one of an initial instances parameter defining how many instances of the recurring appointment should be initially generated, a past window parameter that specifies how many past instances of the recurring appointment are generated, and a future window parameter that specifies how many future instances of the recurring appointment should be displayed at any time, the settings defining how the recurring appointment definition is expanded to generate the instances of the recurring appointment;

generating the instances of the recurring appointment according to the settings, wherein the number of instances is limited by at least one of the settings;

storing the instances at a data storage device;

receiving an updated version of the recurring appointment definition from the client device, the updated version of the recurring appointment definition comprising a new definition of the recurring appointment;

deleting future instances of the recurring appointment from the data storage device;

cloning the recurring appointment definition associated with the recurring appointment to create a cloned version of the recurring appointment definition;

associating at least one of past instances corresponding to the recurring appointment or past exceptions corresponding to the recurring appointment with the cloned version of the recurring appointment definition;

closing the cloned version of the recurring appointment definition; and updating the recurring appointment to reflect the new definition of the recurring appointment.

14. The method of claim 13, further comprising:

receiving a request to synchronize an updated version of the recurring appointment definition with the instances;

determining if the updated version of the recurring appointment definition specifies a recurring appointment for which at least one instance occurs during a past window or a future window;

generating at least one instance of the recurring appointment and storing the instance at the data storage device, in response to determining that at least one instance occurs during the past window or the future window; and skipping synchronization of the updated version of the recurring appointment definition, in response to determining that no instance of the recurring appointment occurs during the past window or the future window.

15. The method of claim 14, further comprising synchronizing the at least one instance with the client device.

16. The method of claim 15, wherein synchronizing the at least one instance comprises:

generating a recurring appointment definition for each instance of the recurring appointment; and synchronizing the recurring appointment definitions with the client device.

17. The method of claim 13, wherein the updated version of the recurring appointment definition is generated when the client device is offline.

18. A computer-readable storage medium having computer readable instructions stored thereupon that, when executed by a computer, cause the computer to:

receive a recurring appointment definition from a client device, the recurring appointment definition comprising a definition of the recurring appointment;

apply settings to the recurring appointment definition, the settings comprising at least one of an initial instances parameter specifying how many instances of the recurring appointment are initially generated, a past window parameter specifying how many past instances of the recurring appointment are generated, and a future window parameter specifying how many future instances of the recurring appointment should be maintained at any time, the settings defining how the recurring appointment definition is expanded to generate one or more instances of the recurring appointment;

generate the one or more instances of the recurring appointment in accordance with the settings, wherein the number of instances is limited by at least one of the settings;

store the one or more instances at a data storage device;

receive an updated version of the recurring appointment definition from the client device, the updated version of the recurring appointment definition comprising a new definition of the recurring appointment;

delete the future instances of the recurring appointment from the data storage device;

clone the recurring appointment definition to create a cloned version of the recurring appointment definition;

associate at least one of past instances or past exceptions corresponding to the recurring appointment with the cloned version of the recurring appointment definition;

close the cloned version of the recurring appointment definition; and update the recurring appointment definition to reflect the new definition of the recurring appointment.

* * * * *